(12) United States Patent
Scates et al.

(10) Patent No.: US 12,199,828 B2
(45) Date of Patent: Jan. 14, 2025

(54) NETWORK TOPOLOGY MONITORING

(71) Applicant: INTERNATIONAL BUSINESS MACHINES CORPORATION, Armonk, NY (US)

(72) Inventors: Charles John Scates, London (GB); Kilian David Joseph Collender, London (GB); Luke Taher, Heswall (GB); Jorge Alberto Diaz Garcia, London (GB)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 17/485,937

(22) Filed: Sep. 27, 2021

(65) Prior Publication Data

US 2023/0099510 A1    Mar. 30, 2023

(51) Int. Cl.
*H04L 41/12* (2022.01)
(52) U.S. Cl.
CPC .................... *H04L 41/12* (2013.01)
(58) Field of Classification Search
CPC ....................................... H04L 41/12
See application file for complete search history.

(56) References Cited

U.S. PATENT DOCUMENTS

| | | | | |
|---|---|---|---|---|
| 2,258,128 | A * | 10/1941 | Black | H03B 5/16 333/170 |
| 8,310,931 | B2 * | 11/2012 | Agrawal | H04L 41/12 370/252 |
| 8,909,762 | B2 * | 12/2014 | Wang | H04L 41/145 709/224 |
| 9,092,445 | B2 | 7/2015 | Ojha | |
| 10,019,190 | B2 * | 7/2018 | Rao | G06F 16/9024 |
| 10,193,741 | B2 | 1/2019 | Zafer et al. | |
| 10,389,606 | B2 * | 8/2019 | Sartran | H04L 45/50 |
| 10,462,014 | B1 * | 10/2019 | Wang | H04W 16/26 |
| 10,977,293 | B2 | 4/2021 | Cai et al. | |
| 11,494,787 | B2 * | 11/2022 | Erickson | G06N 3/08 |
| 11,621,969 | B2 * | 4/2023 | Dodson | H04L 43/20 706/50 |
| 11,757,768 | B1 * | 9/2023 | Zhou | H04L 45/122 370/392 |

(Continued)

FOREIGN PATENT DOCUMENTS

| | | |
|---|---|---|
| CN | 110380888 B | 2/2021 |
| EP | 2807798 B1 | 12/2015 |
| JP | 4376270 B2 | 12/2009 |

OTHER PUBLICATIONS

Deka, R., "Network Anomaly Detection and Prevention using Statistical and Machine Learning Approaches", Dec. 2018, 239 pages.

*Primary Examiner* — Guang W Li
(74) *Attorney, Agent, or Firm* — Eric W. Chesley

(57) ABSTRACT

Embodiments are disclosed for a method. The method includes, for each of multiple vertices, generating a vertex weighting representative of a relative importance of a vertex within the network topology. The method also includes, for each of the one or more edges, generating an edge weighting representative of a relative importance of an edge within the network topology. Further, the method includes generating the abstract graph of the network topology based on a plurality of vertex weightings and one or more edge weightings.

20 Claims, 10 Drawing Sheets

(56) References Cited

U.S. PATENT DOCUMENTS

| | | |
|---|---|---|
| 2007/0156614 A1 | 7/2007 | Flinn et al. |
| 2018/0159744 A1* | 6/2018 | Tee ........................ H04L 41/142 |
| 2018/0270612 A1* | 9/2018 | Thoresen .................. G01S 1/02 |
| 2018/0330258 A1* | 11/2018 | Harris ...................... G06N 7/01 |
| 2018/0336436 A1* | 11/2018 | Cheng ................ G06F 18/2433 |
| 2020/0136891 A1 | 4/2020 | Mdini et al. |
| 2021/0042359 A1* | 2/2021 | Nagayama ............ G06F 18/214 |
| 2021/0241120 A1* | 8/2021 | Chen .................. G06Q 30/0609 |
| 2021/0250282 A1* | 8/2021 | Gresset ................... H04L 67/12 |
| 2021/0258240 A1* | 8/2021 | Gresset .................. H04L 45/02 |
| 2022/0109701 A1* | 4/2022 | Zeng ....................... H04L 63/20 |
| 2023/0004977 A1* | 1/2023 | Cepek ................ G06F 16/9024 |

\* cited by examiner

NETWORK TOPOLOGY MONITORING

BACKGROUND

The present disclosure generally relates to the field of network monitoring, and more particularly, systems and methods for monitoring the topology of a network.

Management of information technology (IT) systems can be a challenging issue for users, such as large organizations, with expanding IT infrastructures and networks. Accordingly, many organizations employ Network Operations Centers (NOCs) in which trained operators utilize IT Operations Management software to diagnose and repair problems, known as incidents, in real time as they occur within their IT infrastructure. Incidents are caused by problems that typically occur on physical or virtual devices within an IT infrastructure, or network. Often a given resource will be relied on by one or more other resources within the network. Consequently, incidents might consist of changes to the topological structure of the network, which can have adverse effects on the functioning of the network as a whole.

SUMMARY

Embodiments are disclosed for a method. The method includes, for each of multiple vertices, generating a vertex weighting representative of a relative importance of a vertex within the network topology. The method also includes, for each of the one or more edges, generating an edge weighting representative of a relative importance of an edge within the network topology. Further, the method includes generating the abstract graph of the network topology based on a plurality of vertex weightings and one or more edge weightings.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
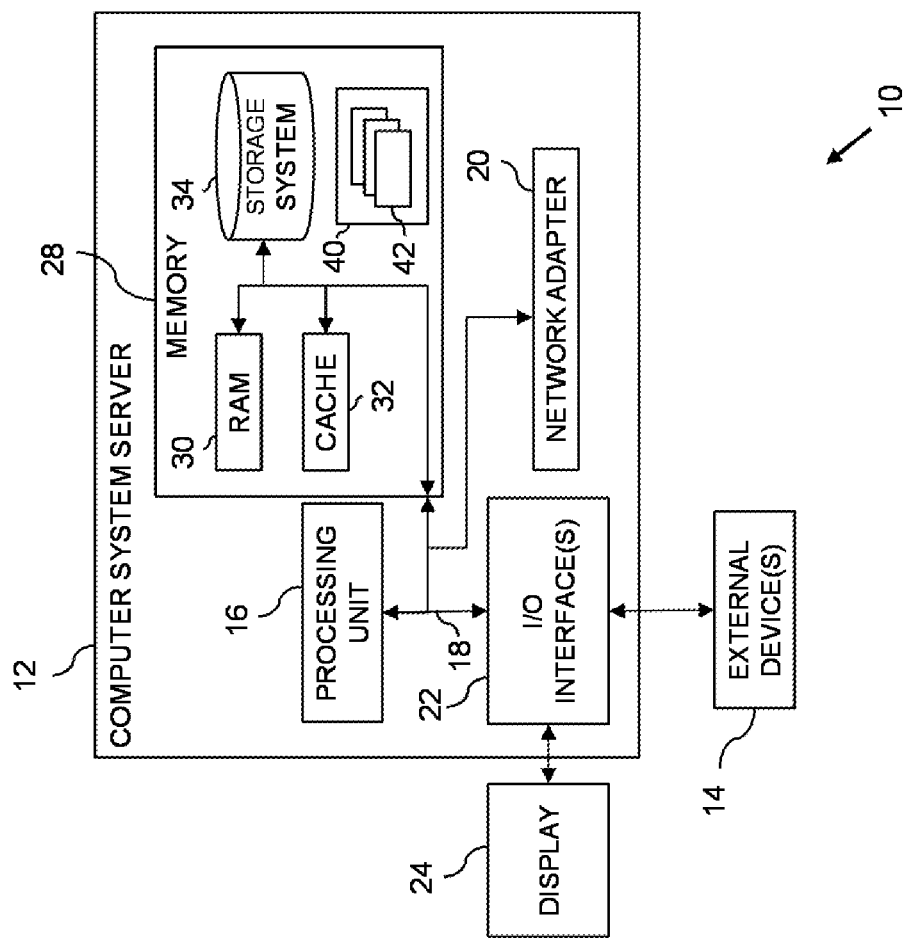
FIG. 1 depicts a cloud computing node, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, incidents might consist of changes to the topological structure of the network, which can have adverse effects on the functioning of the network as a whole. Accordingly, when incidents happen within a network, understanding what has changed in the network becomes an important factor in identifying the cause of the problem, or incident. The change to the network may also indicate the presence of an incident itself. However, identifying changes within a large network can be challenging, meaning there can be a relatively long mean time to know, which is the mean time taken to identify an incident and its cause. Additionally, once the incident and cause are identified, there can be a relatively long resolution time.

The longer the time taken to identify an incident, and to identify the cause of the incident, the greater the overall impact of the incident has on this system. This can be true for incidents occurring in key resources of a network, which are relied upon by a large number of subsequent resources. Further, the impacted subsequent resources may also act as false positives when attempting to identify the source and cause of the incident, which can further impact the resolution time.

Some embodiments of the present disclosure can relate to generating a weighted representation of a network topology, and a computer implemented method for generating an abstract graph of a network topology, wherein the abstract graph is a weighted representation of a network topology. Further, the network topology can include multiple vertices and one or more edges. An edge is a connection between vertices. Upon initialization of the abstract graph, the computer implemented method may include, for each of the vertices, generating a vertex weighting representative of a relative importance of a vertex within the network topology; and for each of the edges, generating an edge weighting representative of a relative importance of an edge within the network topology. Some embodiments of the present disclosure may generate the abstract graph of the network topology based on the vertex weightings and the edge weightings.

Some embodiments of the present disclosure provide a method for generating an abstract graph of a network topology comprising multiple vertices, which may be connected to each other by way of an edge. Each vertex present in the network topology is assigned a vertex weighting, which may represent the importance of the vertex to the network topology. Upon initialization of the abstract graph, the vertex may be assigned a standardized vertex weighting, or the vertex weighting may be predetermined according to the function of the vertex or set by a user. Any connections between the vertices, referred to as edges, are weighted in a similar manner. Accordingly, the abstract graph of the network topology may be generated in an accurate manner according to the vertex weightings and the edge weightings.

Further, some embodiments of the present disclosure may provide concepts for generating a weighted representation of a network topology and for monitoring a network topology over time. More specifically, some embodiments of the present disclosure may provide a method for generating an abstract graph of a network topology, wherein the abstract graph is a weighted representation of a network topology including multiple vertices, which may be connected to each other by way of an edge, each of which are assigned a weighting. Accordingly, the weighted representation of the network topology may be generated in an accurate manner according to the vertex weightings and the edge weightings. The vertex weightings and edge weightings may be updated over time.

Additionally, in some embodiments of the present disclosure, at a point in time after the initialization of the abstract graph of the network topology, the computer implemented method also includes obtaining a live graph of the network topology, wherein the live graph represents the vertices and the edges currently present in the network topology; comparing the live graph of the network topology to the abstract graph of the network topology; adjusting the vertex weightings based on a change to the network topology determined based on the comparison of the live graph to the abstract graph; and, generating an updated abstract graph of the network topology based on the adjusted vertex weightings. In this way, the abstract graph of the network topology may be updated over time as vertex weightings are updated.

Further, in some embodiments of the present disclosure, adjusting the vertex weightings includes determining whether a vertex present in the live graph is present in the abstract graph: if the vertex is present in the live graph and the abstract graph, adjusting the vertex weighting of the vertex; if the vertex is not present in the abstract graph, generating a vertex weighting representative of a relative importance of the vertex within the network topology; and determining whether a vertex that is present in the abstract graph is absent in the live graph: if the vertex is absent in the live graph, adjusting the vertex weighting of the vertex. In this way, the vertex weightings of the vertices may be adjusted over time according to the frequency at which the vertices appear in the network topology.

Additionally, in some embodiments of the present disclosure, if the vertex is present in the abstract graph and absent in the live graph, the computer implemented method further includes comparing the vertex weighting of the vertex to an upper threshold value; and, if the vertex weighting is greater than the upper threshold value, generating an alert.

Also, in some embodiments of the present disclosure, if the vertex is present in the abstract graph and the live graph, the computer implemented method further includes comparing the vertex weighting of the vertex to a lower threshold value; and if the vertex weighting is less than the lower threshold value, generating an alert.

In a further embodiment, if the vertex is present in the abstract graph and the live graph, adjusting the vertex weighting of the vertex includes increasing the vertex weighting. In this way, the weighting of a vertex that appears more regularly may be increased to reflect that the given vertex may be more important to the network topology.

According to some embodiments of the present disclosure, if it is determined that the vertex is absent in the live graph, adjusting the vertex weighting of the vertex includes decreasing the vertex weighting of the vertex code. In this way, the vertex weighting of a vertex that appears less frequently may be decreased to reflect that the given vertex may be less important to the network topology.

According to some embodiments of the present disclosure, at a point in time after the initialization of the abstract graph of the network topology, the method further includes obtaining a live graph of the network topology, wherein the live graph represents the vertices and the one or more edges currently present in the network topology; comparing the live graph of the network topology to the abstract graph of the network topology; adjusting the one or more edge weightings based on a change to the network topology determined based on the comparison of the live graph to the abstract graph; and generating an updated abstract graph of the network topology based on the adjusted edge weightings. In this way, the map of the network topology may be updated over time as the edge weightings are updated.

In a further embodiment, the computer implemented method further includes determining whether an edge present in the live graph is present in the abstract graph: if the edge is present in the live graph and the abstract graph, adjusting the edge weighting of the edge; if the edge is not present in the abstract graph, generating an edge weighting representative of a relative importance of the edge within the network topology; and determining whether an edge that is present in the abstract graph is absent in the live graph: if the edge is absent in the live graph, adjusting the edge weighting of the edge. In this way, the edge weightings of the edges, or vertex connections, may be adjusted over time according to the frequency at which the edges appear in the network topology.

In a further embodiment, if the edge is present in the abstract graph and absent in the live graph, wherein the computer implemented method further includes comparing the edge weighting of the edge to an upper threshold value; and if the edge weighting is greater than the upper threshold value, generating an alert.

In a further embodiment, if the edge is present in the abstract graph and the live graph, the computer implemented method further includes comparing the edge weighting of the edge to a lower threshold value; and if the edge weighting is less than the lower threshold value, generating an alert.

In a further embodiment, if the edge is present in the abstract graph and the live graph, adjusting the edge weighting of the edge includes increasing the edge weighting. In this way, the edge weighting of an edge that appears more regularly may be increased to reflect that the given edge may be more important to the network topology.

According to some embodiments of the present disclosure, if the edge is present in the abstract graph and is absent in the live graph, adjusting the edge weighting of the edge includes decreasing the edge weighting of the edge. In this way, the edge weighting of an edge that appears less frequently may be decreased to reflect that the given edge may be less important to the network topology.

According to some embodiments of the present disclosure, the method further includes obtaining an identifying feature of each vertex; generating a hash code for each vertex based on the identifying feature; and assigning the vertex weighting of each vertex to the respective hash code as a hash weighting. In a first stage of the method, the vertices that are active in the network topology may be identified and hashed based on an identifying feature of the vertex. The extraction of the identifying feature from the active vertex may serve to correctly identify vertices that have undergone a change in name or instance, but remain functionally the same, as belonging to the same hash code. Similarly, the extraction of the identifying feature from the active vertex may also serve to correctly differentiate between vertices having the same name but different functions. Thus, the accuracy of the map of the network topology may be increased by assigning the vertex weightings to the hash codes in order to store the weighting values over time.

In a further embodiment, obtaining the live graph of the network topology includes, for each vertex present in the live graph: determining whether a hash code exists for a vertex: if a hash code does exist for the vertex: assigning the hash weighting of the hash code to the vertex as the vertex weighting; and adjusting the hash weighting based on a change to the network topology; if a hash code does not exist for the vertex: obtaining an identifying feature of the vertex; generating a hash code the vertex based on the identifying feature; and assigning the vertex weighting of the vertex to the respective hash code as a hash weighting.

According to some embodiments of the present disclosure, wherein the vertex weightings and the edge weightings are fuzzy weightings having a value greater than or equal to zero and less than one.

Some embodiments of the present disclosure further relate to a computer implemented method for detecting a change in a network topology over time, wherein the network topology includes vertices and one or more edges, wherein an edge is a connection between vertices, the computer implemented method includes obtaining an abstract graph of a network topology, wherein the abstract graph is a weighted representation of the network topology generated based on vertex weightings representative of a relative importance of the vertices within the network topology and one or more edge weightings representative of a relative importance of the one or more edges within the network topology; and at a point in time after the generation of the abstract graph of the network topology: obtaining a live graph of the network topology, wherein the live graph represents the vertices and the one or more edges currently present in the network topology; comparing the live graph of the network topology to the abstract graph of the network topology; adjusting the vertex weightings based on a change to the network topology determined based on the comparison of the live graph to the abstract graph; adjusting the one or more edge weightings based on a change to the network topology determined based on the comparison of the live graph to the abstract graph; if a vertex having a vertex weighting, and/or an edge with an edge weighting, above an upper threshold is absent from the live graph of the network topology, generating an alert; and if a vertex having a vertex weighting, and/or an edge with an edge weighting, below a lower threshold is present in the live graph of the network topology, generating an alert.

Some embodiments of the present disclosure also relate to a computer program product for generating an abstract graph of a network topology, wherein the abstract graph is a weighted representation of a network topology, wherein at a first point in time the network topology includes vertices and one or more edges, wherein an edge is a connection between vertices, the computer program product comprising a computer readable storage medium having program instructions embodied therewith, the program instructions executable by a processing unit to cause the processing unit to, upon initialization of the abstract graph, perform a method including, for each of the vertices, generating a vertex weighting representative of a relative importance of a vertex within the network topology; for each of the one or more edges, generating an edge weighting representative of a relative importance of an edge within the network topology; and generating an abstract graph of the network topology based on the vertex weightings and the one or more edge weightings.

Some embodiments of the present disclosure further relate to a processing system comprising at least one processor and the computer program product described above, wherein the at least one processor is adapted to execute the computer program code of said computer program product.

Some embodiments of the present disclosure further relate to a system for generating an abstract graph of a network topology, wherein the abstract graph is a weighted representation of a network topology, wherein the network topology includes vertices and one or more edges, wherein an edge is a connection between vertices, the system including a processing unit adapted to, upon initialization of the abstract graph, perform the function of: for each of the vertices, generate a vertex weighting representative of a relative importance of a vertex within the network topology; for each of the one or more edges, generate an edge weighting representative of a relative importance of an edge within the network topology; and generate an abstract graph of the network topology based on the vertex weightings and the one or more edge weightings.

Some embodiments of the present disclosure provide concepts for generating a weighted representation of a network topology and for monitoring a network topology over time. Additionally, some embodiments may provide a method for generating an abstract graph of a network topology, wherein the abstract graph is a weighted representation of a network topology comprising vertices, which may be connected to each other by way of an edge, each of which are assigned a weighting. The vertex weightings and the edge weightings may be representative of a relative importance of a vertex and an edge within the network topology. The weighted representation of the network topology may then be generated in an accurate manner according to the vertex weightings and the edge weightings. The vertex weightings and edge weightings may be updated over time and may be used to generate an alert for anomalous changes to the network topology.

It is understood in advance that although this disclosure includes a detailed description on cloud computing, implementation of the techniques recited herein are not limited to a cloud computing environment. Rather, some embodiments of the present disclosure may be capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

FIG. 1 depicts a cloud computing node 10, in accordance with some embodiments of the present disclosure. As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client 40 can be implemented as one or more of the program modules 42. Additionally, the DHCP client 40 may be implemented as separate dedicated processors or a single or several processors to provide the functionality described herein. In embodiments, the DHCP client 40 performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
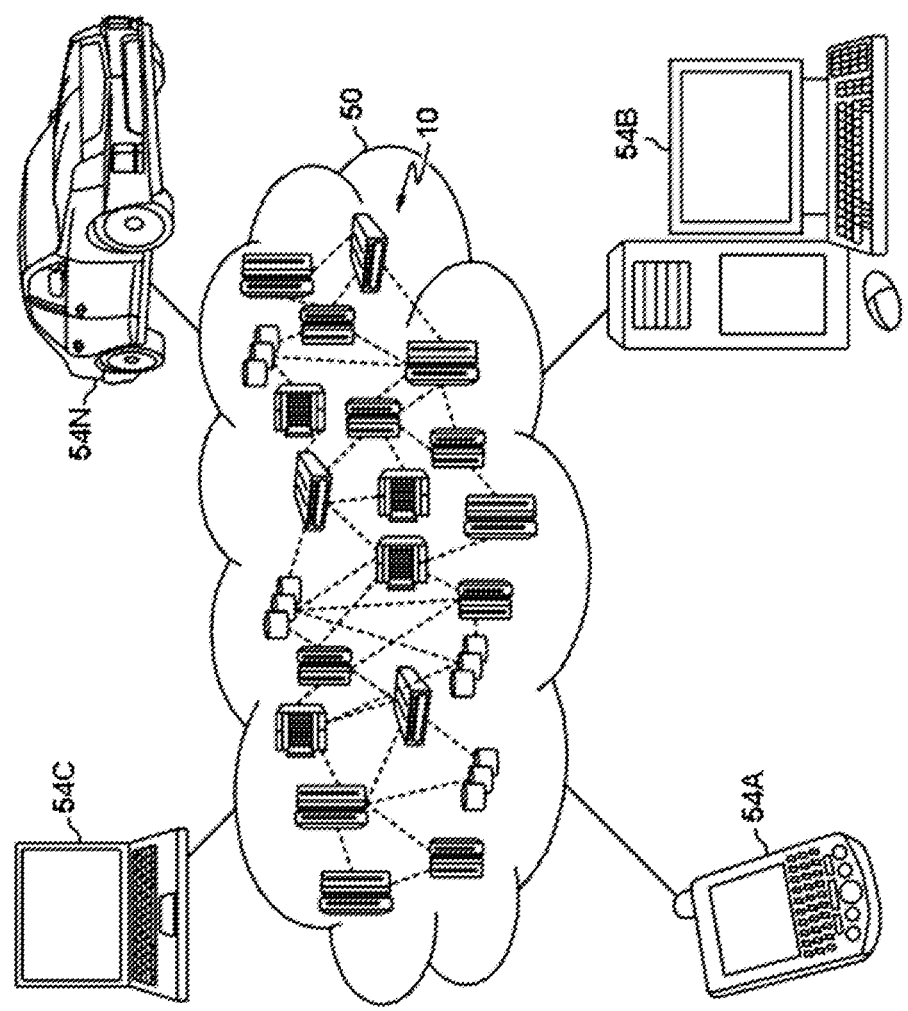
FIG. 2 depicts a cloud computing environment, in accordance with some embodiments of the present disclosure.

FIG. 2 depicts a cloud computing environment 50, in accordance with some embodiments of the present disclosure. In FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
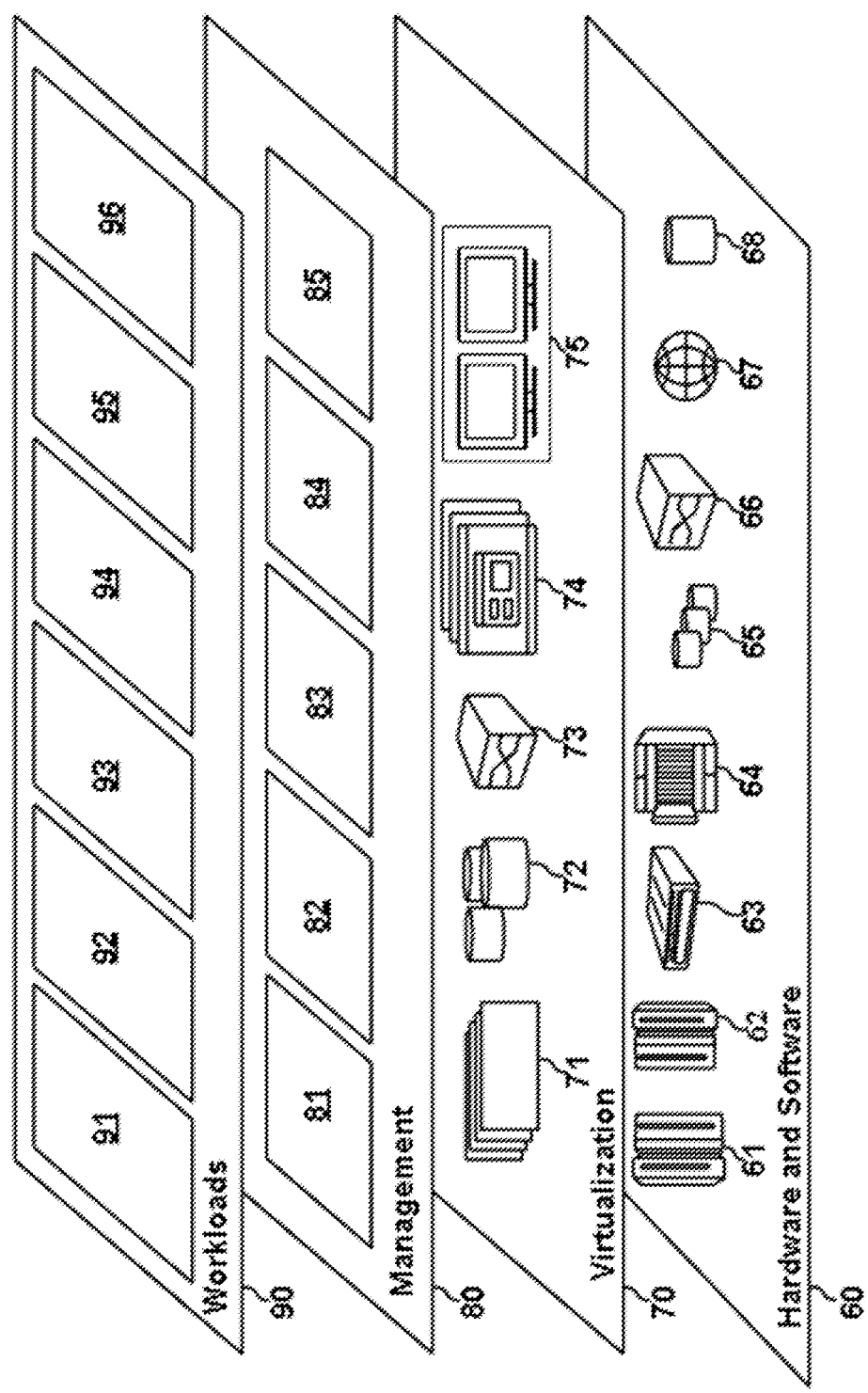
FIG. 3 depicts abstraction model layers, in accordance with some embodiments of the present disclosure.

FIG. 3 depicts abstraction model layers, in accordance with some embodiments of the present disclosure. In FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network monitoring processes 96 described herein. In accordance with aspects of the invention, the network monitoring processes 96 workload/function operates to perform one or more of the processes described herein.

Figure 4:
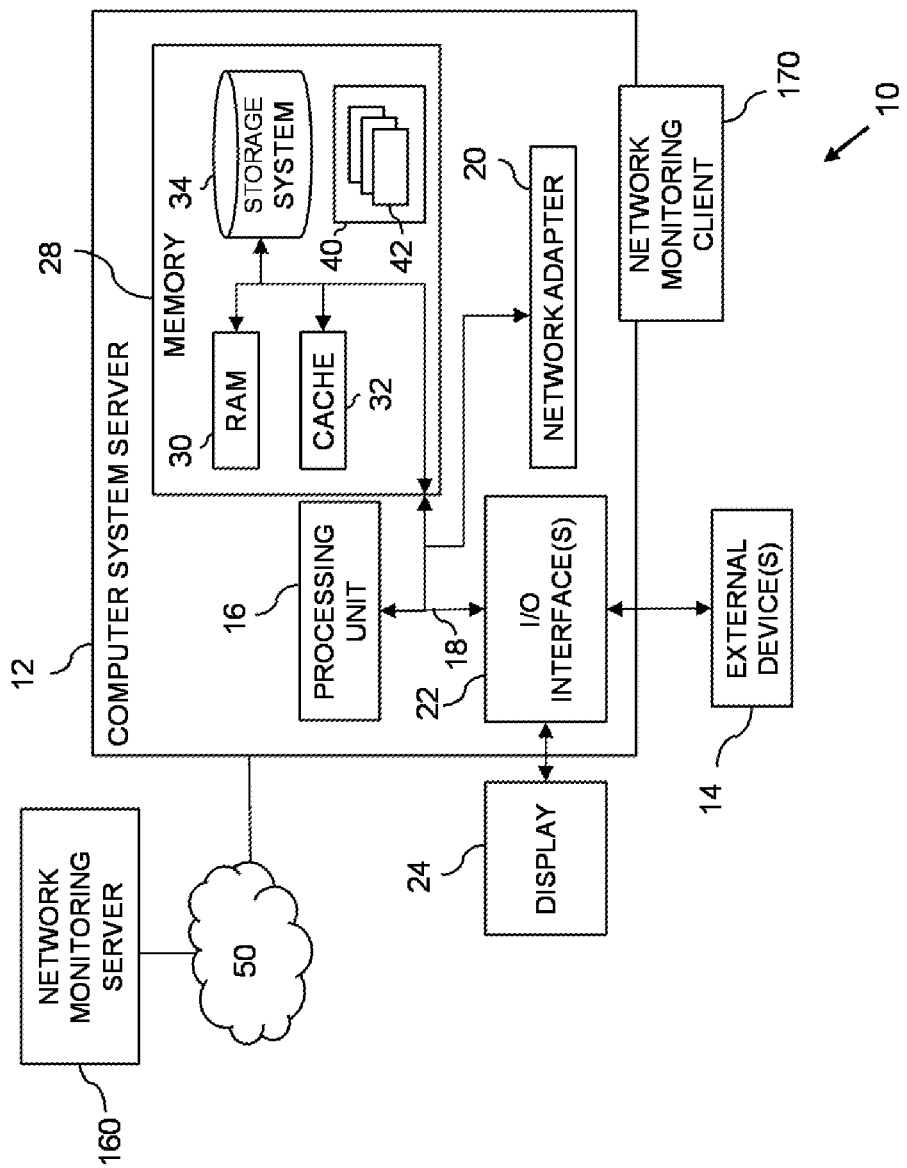
FIG. 4 depicts a cloud computing node, in accordance with some embodiments of the present disclosure.

FIG. 4 depicts a cloud computing node, in accordance with some embodiments of the present disclosure. In particular, FIG. 4 is another cloud computing node which includes a same cloud computing node 10 as FIG. 1. In FIG. 4, the computer system/server 12 also includes or communicates with a network monitoring client 170, and a network monitoring server 160.

According to some embodiments of the present disclosure, the network monitoring client 170 can be implemented as one or more program code in program modules 42 stored in memory as separate or combined modules. Additionally, the network monitoring client 170 may be implemented as separate dedicated processors or a single or several processors to provide the function of these tools. While executing the computer program code, the processing unit 16 can read and/or write data to/from memory, storage system, and/or I/O interface 22. The program code executes the techniques described herein.

By way of example, network monitoring client 170 may be configured to communicate with the network monitoring server 160 via a cloud computing environment 50. As discussed with reference to FIG. 2, for example, cloud computing environment 50 may be the Internet, a local area network, a wide area network, and/or a wireless network. In embodiments of the proposed network monitoring mechanism, the network monitoring server 160 may provision data to the client 170. One of ordinary skill in the art would understand that the network monitoring client 170 and network monitoring server 160 may communicate directly. Alternatively, a relay agent may be used as an intermediary to relay messages between network monitoring client 170 and network monitoring server 160 via the cloud computing environment 50.

Figure 5:
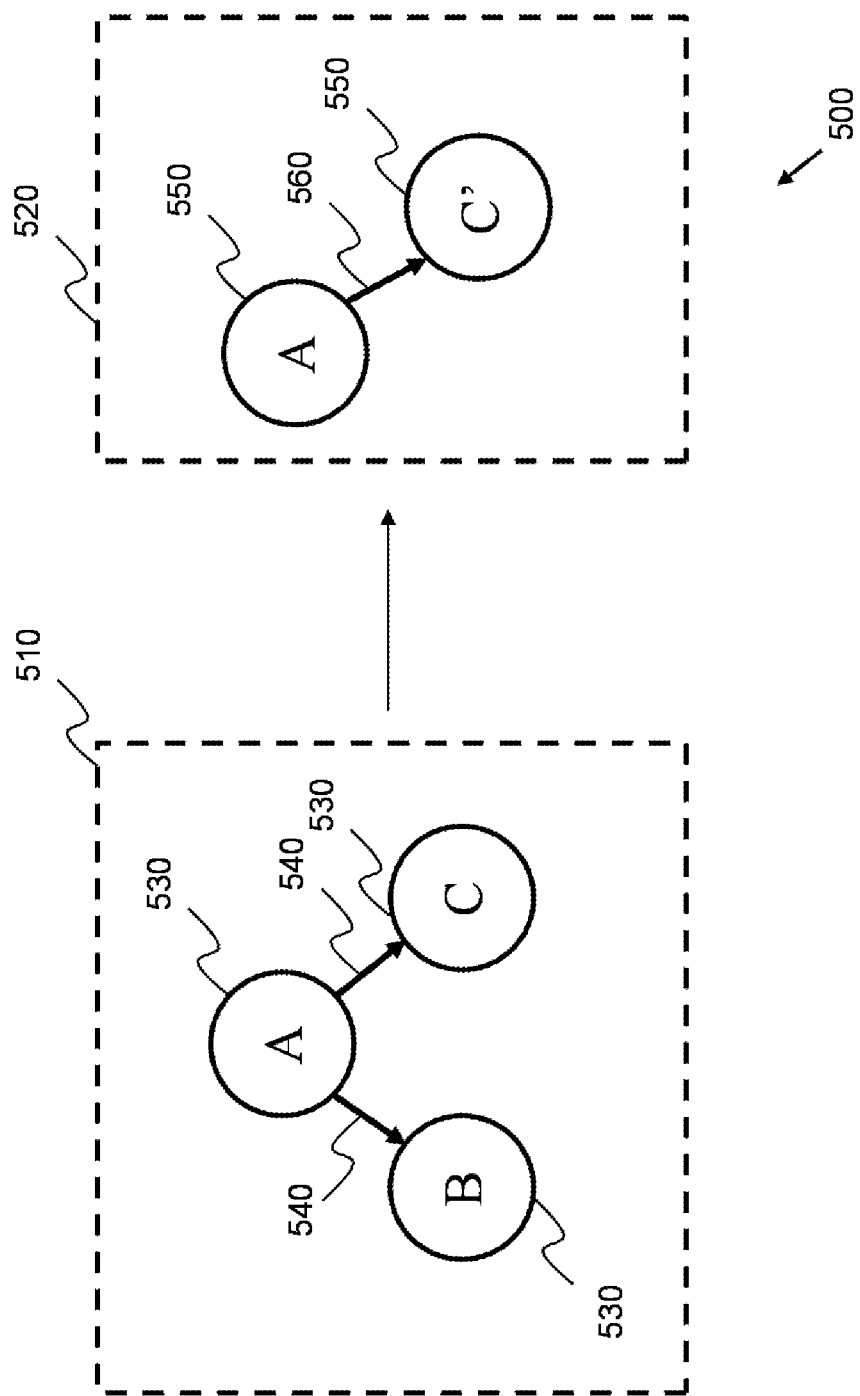
FIG. 5 depicts a simplified schematic representation of a network topology, in accordance with some embodiments of the present disclosure.

FIG. 5 depicts a simplified schematic representation of a network topology 500 in an abstract graph 510, in accordance with some embodiments of the present disclosure. The network topology 500 in the abstract graph 510 may depict an aggregated representation of the edges and vertices that have appeared in the network topology over time, and a live graph 520, which may depict the edges and vertices currently present in the network topology.

In the example shown in FIG. 5, the abstract graph 510 of the network topology 500 includes three vertices 530 (vertex A, vertex B and vertex C). A vertex is representative of a resource of the network in the network topology. Edges are defined as connections between vertices and represent a connection between one resource of the network and another. In the example shown in FIG. 5, the abstract graph of the network topology, in addition to the three vertices, further includes two edges 540. One of the edges connects vertex A and vertex B and the other edge connects vertex A and vertex C.

As discussed above, network topologies may change over time, for example due to an incident occurring within the network or due to a change in operation of the network. In the live graph 520 of the network topology, the network topology 500 shown in FIG. 5, has changed relative to the abstract graph. In the live graph, the network topology includes two vertices 550 (vertex A and vertex C') and one edge 560 between vertex A and vertex C'.

Figure 6:
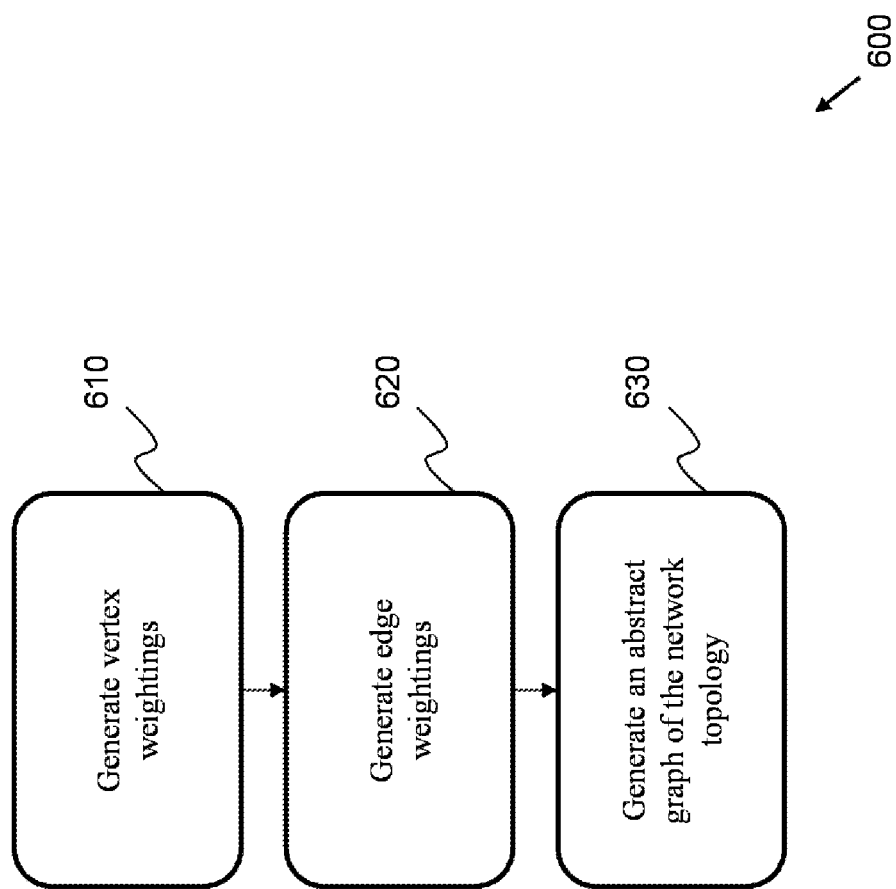
FIG. 6 depicts a method for generating an abstract graph of a network topology, in accordance with some embodiments of the present disclosure.

FIG. 6 depicts a method 600 for generating an abstract graph of a network topology, in accordance with some embodiments of the present disclosure. In the method 600, the abstract graph is a weighted representation of a network topology according to an aspect of the disclosure. As discussed above with reference to FIG. 5, a network topology includes vertices and one or more edges, wherein an edge is a connection between vertices. In particular, FIG. 6 depicts a method for initializing an abstract graph for a network topology.

The method 600 begins in step 610, wherein for each of the vertices present in the network topology, a vertex weighting is generated. The vertex weighting generated for each of the vertices is representative of a relative importance of a vertex within the network topology.

The relative importance of a vertex may be calculated according to a number of different importance factors. For example, the more frequently a given vertex appears within the network topology, the higher the relative importance of the vertex may be, which in turn may result in a higher vertex weighting. Similarly, the less frequently a given vertex appears within the network topology, the lower the relative importance of the vertex may be, which in turn may result in a lower vertex weighting. Thus, the relative importance of a vertex, and so the vertex weighting, may be generated according to one or more of: a frequency of appearance of the vertex in the network topology; a number of edges associated with the vertex; a function of the vertex; and the like.

The vertex weightings, and the edge weightings that are described in more detail below, may be fuzzy weightings having a value greater than or equal to zero and less than one. A weighting value of 0 meaning a vertex or edge is never seen and a weighting value of close to 1 meaning a vertex or edge is almost always seen. For example, in a network topology consisting of a kubernetes environment, a pod, or a vertex, which is always running will have a fuzzy weight ~1 and a pod which is almost never running will have a fuzzy weight ~0.

A fuzzy function is a function mapping each element of the domain, i.e., a vertex or an edge, to some real number greater than or equal to 0 and less than 1. The fuzzy weighting of a given element of the domain is the real number assigned to it by the fuzzy function. This concept is often used in scenarios where absolute existence or membership is not able to be determined and so fuzzy weights are used to show how close to fully existing or being a member of an environment a given element is. According to the current concept, the fuzzy weightings accurately represent how important a given vertex or edge is to the network topology over time.

The method may further include applying a hashing function to the vertices of the network topology. In particular, the method may further include the steps of obtaining an identifying feature of each vertex; generating a hash code for each vertex based on the identifying feature; and assigning the vertex weighting of each vertex to the respective hash code as a hash weighting. In this case, when obtaining a live graph of the network topology, the method may include the steps of determining whether a hash code exists for a vertex, if a hash code does exist for the vertex, assigning the hash weighting of the hash code to the vertex as the vertex weighting and adjusting the hash weighting based on a change to the network topology. If a hash code does not exist for the vertex, the method may include the steps of obtaining an identifying feature of the vertex, generating a hash code for the vertex based on the identifying feature and assigning the vertex weighting of the vertex to the respective hash code as a hash weighting.

The hashing function, which is adapted to generate a hash code for each vertex, is adapted to identify what is a unique vertex in the live graph. The hashing function is referred to herein as the α function. This hashing function, which may be different for each implementation of the network monitoring, may map a given vertex in the network topology to a hash by identifying what is considered the defining fields, or identifying feature, of a unique resource in the network environment. In this way, the hashing function may identify multiple instances of the same vertex within the network or identify the same resource over time, which may be used for forming an abstract graph of the network topology.

In addition, the hashing function also keeps, as part of the generated hash code, the number of each unique vertex currently mapped to it at a given time. The implementation of this a function may be adjusted by the user, as it will depend on what fields signify a unique vertex in the given network topology. It should be noted that, in dynamic systems, the α function can be adjusted to reduce noise in the weighted representation of the network topology. In the example of pods in a kubernetes environment, the α function may be adjusted based on deployment name or factor that is more constant than the volatile pods. Further, the α function may provide a more domain specific vertex identification heuristic, for example through a regular expression on a name field.

The fuzzy function may then map fuzzy weights, representative of the importance, to each of the unique vertex hashes from the α function. The fuzzy function may be referred to as the β function, which may be updated over time such that the more often and recently a vertex is seen represented in the live graph of the network topology, the higher the fuzzy weight assigned to the vertex and the less often a vertex is seen, the lower the fuzzy weight. These are the values that may be used for the alerting of an unexpectedly present or absent vertex in the network topology, as discussed further below.

In step 620, for each of the one or more edges present in the network topology, an edge weighting representative of a relative importance of an edge within the network topology is generated. Generating the edge weightings for the one or more edges may include the steps of: identifying any edges present between the vertices in the network topology; and generating an edge weighting for each identified edge.

Further, a matrix containing the fuzzy weight of each connection between each hash in the α function, i.e., the edges of the network topology, is generated. This matrix may be updated in the same way as the $_R$ function as described above, such that the more often and recent edges of the network topology have a higher fuzzy value, corresponding to the importance of the edge in the network topology.

In step 630, an abstract graph of the network topology is generated based on the vertex weightings and the one or more edge weightings. The three elements described above, the α function, β function and the matrix of edge weightings, may be combined as a mechanism to both form an abstract graph for a given network topology, representing the general structure of a network, as well as a way to test the network topology, at a given time, against its known general structure.

It should be noted that the generation steps described above with reference to FIG. 6, may be performed as an initialization of the abstract graph at time zero. Following the initialization stage, the edge weightings and the vertex weightings may be adjusted rather than generated.

Figure 7:
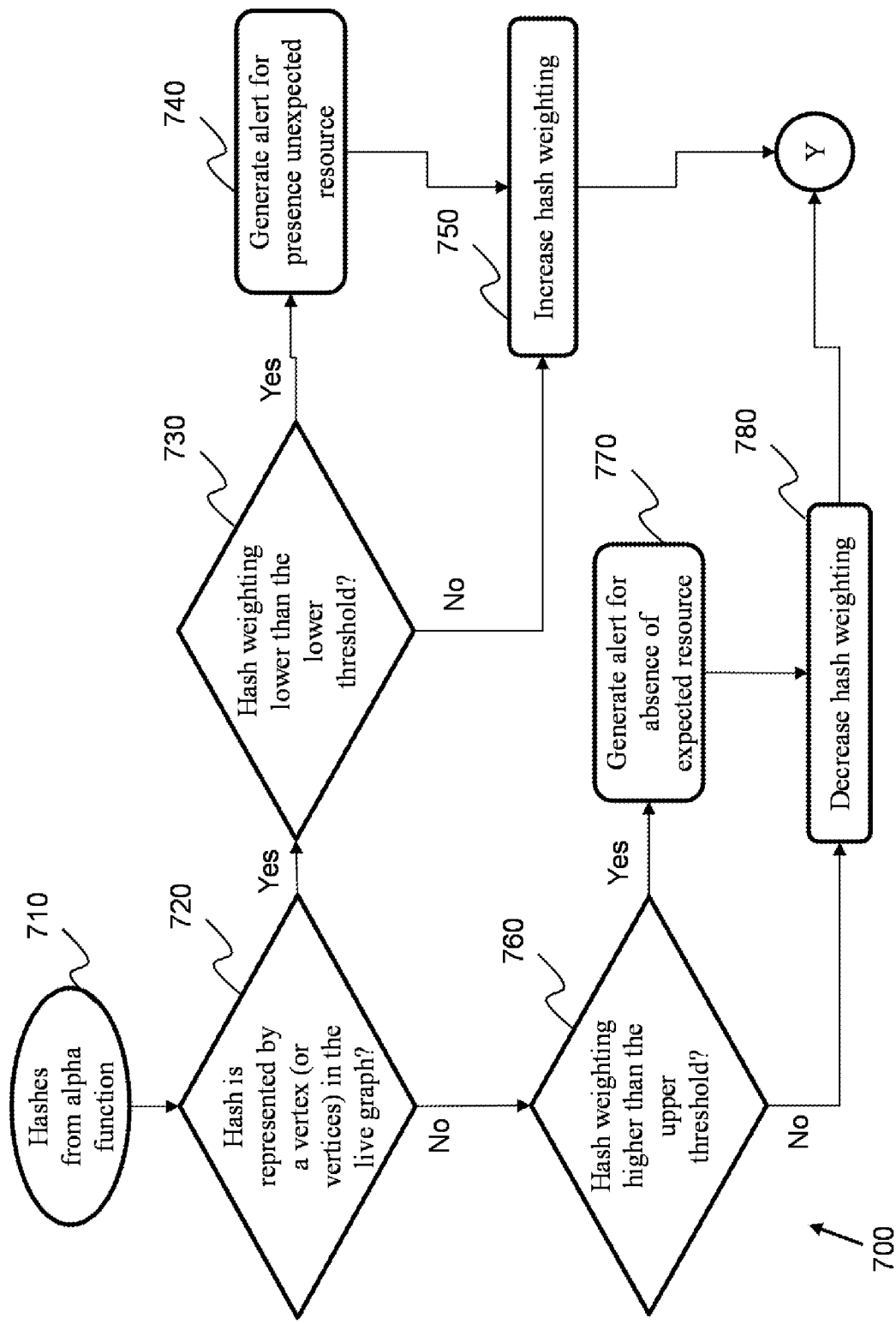
FIG. 7 depicts a method for monitoring the network topology, in accordance with some embodiments of the present disclosure.

FIG. 7 depicts a method 700 for monitoring the network topology, in accordance with some embodiments of the present disclosure. The method includes adjusting the vertex weightings based on a change to the network topology. The method depicted in FIG. 7 may follow on from the method depicted in FIG. 6. For instance, the method depicted in FIG. 6 may occur at an initialization time and the method depicted in FIG. 7 may occur at a later point in time.

In step 710, the hash codes, and the associated hash weightings, may be obtained from the abstract graph of the network topology. The hash codes obtained from the abstract graph are the hash codes for every vertex seen in the live graph so far, i.e., since the initialization of the abstract graph.

In step 720, it may be determined whether a vertex present in the abstract graph, represented by a hash code, is present in the live graph. If it is determined that the vertex is present in the live graph and the abstract graph, the method may progress to step 730, wherein it is determined whether the hash weighting, or vertex weighting, of the given vertex is below a lower threshold.

If the hash weighting, or vertex weighting, of the vertex present in both the live graph and the abstract graph is below the lower threshold, an alert may be generated in step 740. The alert may specify that an unexpected resource is present in the live graph.

After the alert has been generated, or if it was determined that the vertex weighting of the given vertex was not below the lower threshold in step 730, the method may progress to step 750, wherein the hash weighting, or the vertex weighting, of the given vertex is increased in the abstract graph. The lower threshold value may be set according to the implementation of the network monitoring methods.

Returning to step 720, if it is determined that the vertex is absent in the live graph, but present in the abstract graph, the method may progress to step 760, wherein it is determined whether the hash weighting, or vertex weighting, of the given vertex is above an upper threshold.

If the hash weighting, or vertex weighting, of the vertex absent in the live graph, but present in the abstract graph, is above the upper threshold, an alert may be generated in step 770. The alert may specify that an expected resource is absent in the live graph.

After the alert has been generated, or if it was determined that the vertex weighting of the given vertex was not above the upper threshold in step 760, the method may progress to step 780, wherein the hash weighting, or the vertex weighting, of the given vertex is decreased in the abstract graph. Once again, the upper threshold value may be set according to the implementation of the network monitoring methods.

Figure 8:
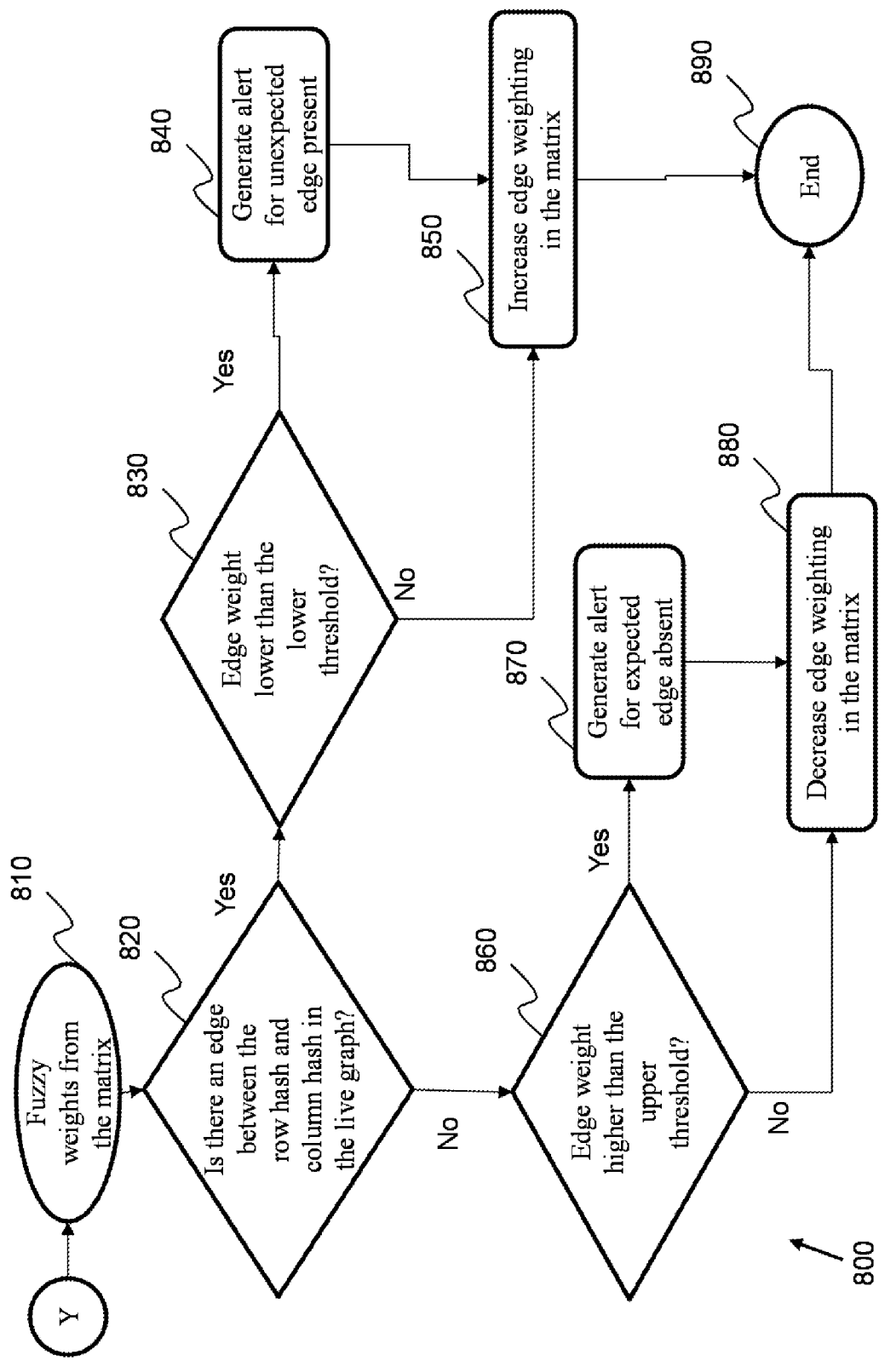
FIG. 8 depicts a further method for monitoring the network topology, in accordance with some embodiments of the present disclosure.

FIG. 8 depicts a method 800 for monitoring the network topology, in accordance with some embodiments of the present disclosure. The method 800 includes adjusting the edge weightings based on a change to the network topology. The method depicted in FIG. 8 may follow on from the method depicted in FIG. 7. For instance, the method depicted in FIG. 8 may occur at the same point in time as the method depicted in FIG. 7.

In step 810, the edge weightings may be obtained from the abstract graph of the network topology.

In step 820, it may be determined whether an edge present in the abstract graph is present in the live graph. If it is determined that the edge is present in the live graph and the abstract graph, the method may progress to step 830, wherein it is determined whether the edge weighting of the given edge is below a lower threshold.

If the edge weighting of the edge present in both the live graph and the abstract graph is below the lower threshold, an alert may be generated in step 840. The alert may specify that an unexpected resource is present in the live graph.

After the alert has been generated, or if it was determined that the edge weighting of the given edge was not below the lower threshold in step 830, the method may progress to step 850, wherein the edge weighting of the given edge is increased in the abstract graph. The threshold value may be set according to the implementation of the network monitoring methods.

Returning to step 820, if it is determined that the edge is absent in the live graph, but present in the abstract graph, the method may progress to step 860, wherein it is determined whether the edge weighting of the given edge is above an upper threshold.

If the edge weighting of the edge absent in the live graph, but present in the abstract graph, is above the upper threshold, an alert may be generated in step 870. The alert may specify that an expected resource is absent in the live graph.

After the alert has been generated, or if it was determined that the edge weighting of the given edge was not above the upper threshold in step 860, the method may progress to step 880, wherein the edge weighting of the given edge is decreased in the abstract graph. Once again, the upper threshold value may be set according to the implementation of the network monitoring methods.

The method may end in step 890, with an updated abstract graph of the network topology having been generated based on the adjusted vertex weightings and the adjusted edge weightings generated according to the methods described above.

Some embodiments of the present disclosure can detect significant changes in a given network topology by forming, over time, a weighted abstract graph of the network topology. The abstract graph is formed by tracking the network topology over time, and constantly updating the weighting values corresponding to the importance of each vertex and edge.

Figure 9:
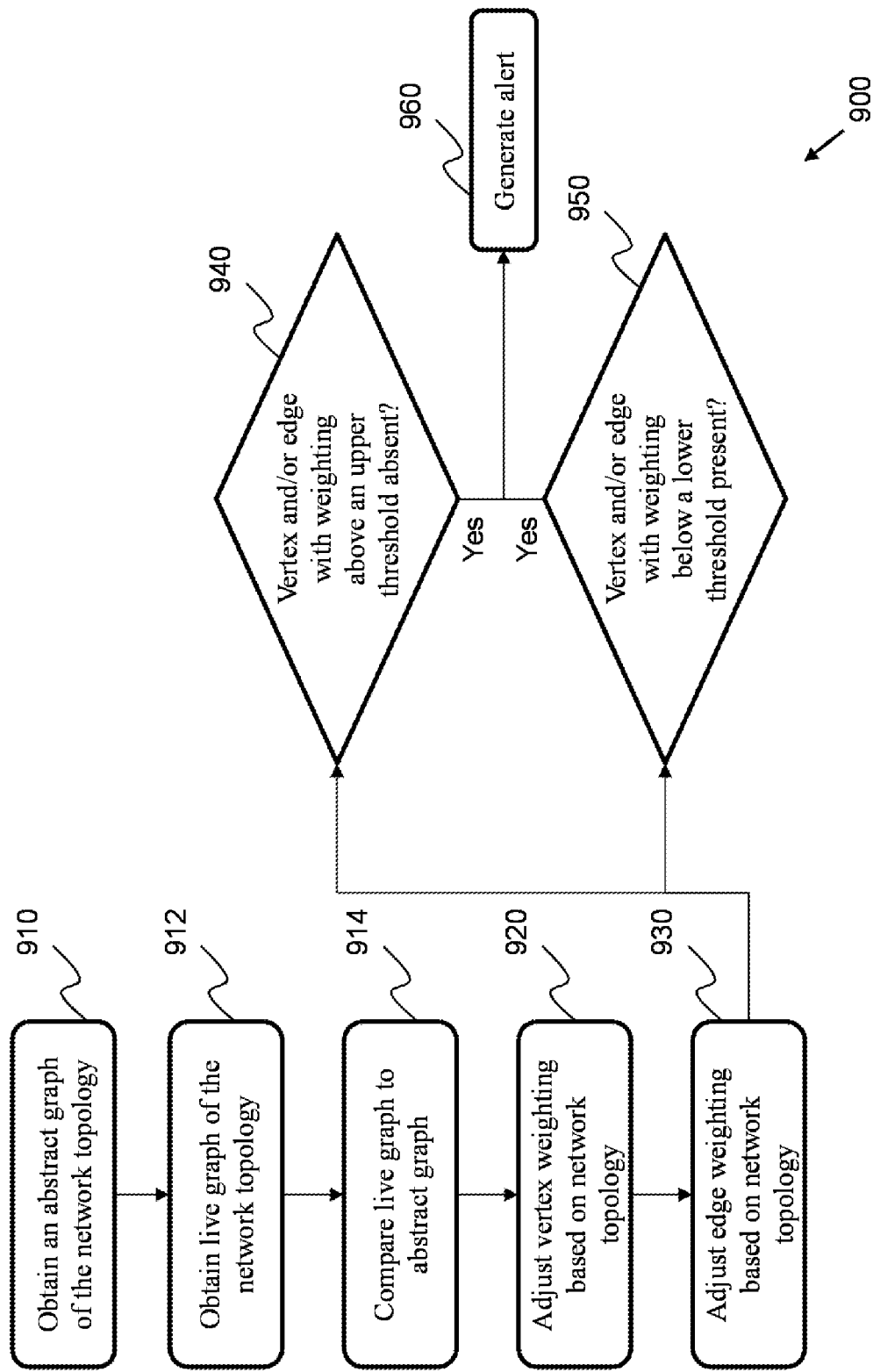
FIG. 9 depicts a further method for monitoring the network topology, in accordance with some embodiments of the present disclosure.

FIG. 9 depicts a further method 900 for monitoring the network topology, in accordance with some embodiments of the present disclosure. The method includes detecting a change in a network topology over time.

In step 910, an abstract graph of the network topology is obtained. The weighted representation of the network topology may have been generated based on vertex weightings representative of a relative importance of the vertices within the network topology and one or more edge weightings representative of a relative importance of the one or more edges within the network topology as described above.

In step 912, a live graph of the network topology is obtained. The live graph may represent the vertices and the one or more edges currently present in the network topology. In step 914, the live graph of the network topology is compared to the abstract graph of the network topology.

In step 920, at a second point in time, the vertex weightings may be adjusted based on a change to the network topology and in step 930, at the second point in time, the one or more edge weightings are adjusted based on a change to the network topology. The changes to the network topology may be determined based on the comparison of the live graph to the abstract graph.

In step 940, it is determined whether a vertex having a vertex weighting, and/or an edge with an edge weighting, above an upper threshold is absent from the live graph of the network topology. Further, in step 950, it is determined whether a vertex having a vertex weighting, and/or an edge with an edge weighting, below a lower threshold is present in the live graph of the network topology.

If a vertex having a vertex weighting, and/or an edge with an edge weighting, above an upper threshold is absent or a vertex having a vertex weighting, and/or an edge with an edge weighting, below a lower threshold is present in the live graph of the network topology, an alert may be generated to be provided to a user or an automated system monitor. This is illustrated at step 960.

At each time step, the current network topology, which may be referred to as the live graph to distinguish the current network topology from the abstract graph, may be compared to the abstract graph. During the comparison of the live graph to the abstract graph, any missing vertices or edges that have a high importance value or any present vertices or edges with a low importance value detected may be flagged with an alert to be dealt with by the system in which the methods described herein are implemented. It should be noted that what is considered a "high importance value" or a "low importance value" is determined by predefined thresholds between 0 and 1.

There is provided below a worked example of the methods described above. For the purposes of the worked example, let G be a live graph of the network topology at some given time. The network topology includes a set of vertices, V, and a set of edges E, which are a subset of the matrix V×V. Thus, the live graph may be defined as G=(V, E).

The abstract graph of G may then be defined as H=($\alpha,\beta$, M), where: $\alpha$ is a hashing function, for picking out the identifying features of each vertex in V; $\beta$ is a fuzzy function for the relative importance of each element of the codomain of $\alpha$; and M is a matrix whose rows and columns represent the members of the codomain of $\alpha$ and the values in the matrix, which are between 0 and 1, represent the weighting of the edges in the network topology. It should be noted that it may be assumed for the purposes of this example that the vertices in the abstract graph are either connected in a directional manner or not, and the cases of the types of edges are not considered. However, the abstract graph may account for the types of edges.

Considering the $\alpha$ function in more detail, this function represents the hashing of the vertices in the live graph, such that the same resource, or vertex, can be spotted at different points in time. The $\alpha$ function may operate by picking out uniquely identifying features of the given vertex in the live graph and using these identifying features as the hash code. The $\alpha$ function may also keep track of the number of vertices in the live graph mapped to each element by a leading counter. Accordingly, the succeeding $\beta$ function may then check whether a resource, or vertex, appears in the live graph and also the multiplicity of this resource. For example, it may be known in a system network that vertex name and vertex type are the defining identifying features of the vertices in the abstract graph. Therefore, the $\alpha$ function may take the form:

$$\alpha:\{\ldots,\text{name},\ldots,\text{vertexType},\ldots\} \mapsto (\text{counter}, \text{name},\text{vertexType}).$$

Thus, any resource that has the same name and vertex type in the live graph corresponds to the same hash in the abstract graph, meaning that the resources of the network may be tracked over time.

Considering the $\beta$ function in more detail, this function is the fuzzy elements for the seen hashes of the $\alpha$ function. Every hash is mapped to a value greater than or equal to 0 and less than 1 by the $\beta$ function indicating how important the hashes are, which may be based on how often each vertex is seen in the graph. The relative importance value is a measure that is updated over time: weighting recent data over older data. In addition, there may be defined a threshold figure, to indicate what fuzzy value, greater than or equal to 0 and less than 1, is considered to be significant within the network. For example, if the threshold set is 0.75, then any absence of a hash in the live graph with a fuzzy value above 0.75 may trigger an alert. Likewise, a lower threshold can be set such that the appearance of any hash with fuzzy value below the lower threshold would also trigger an alert. Furthermore, given the leading counter of each hash, this fuzzy function may also track the importance of vertex multiplicity when it is present in the network topology. It should be noted that, the initial value of the relative importance allotted by this function may be adjusted according to the implementation of the methods described herein. By way of example, the vertex weighting of a vertex seen for the first time within the network topology may be a value between the thresholds defined above, such as 0.5 for each new vertex seen.

Considering the Matrix, M, in more detail, this is a matrix that represents the edges between the hashes of a, each row and column representing all of the different hashes that have been seen in the network topology so far. For example, taking a set of hash codes, the weight of the edge from ai to aj is represented by the value in the ith row and jth column of the matrix M.

As the values in this matrix are fuzzy values, the matrix elements will be greater than or equal to 0 and less than 1, 0 indicating there has never been an edge between the vertices represented by the given matrix element and a value close to 1 meaning there has almost always been an edge between the vertices represented by the given matrix element. Therefore, the higher the value of the matrix elements, i.e., the edge weightings, the higher the relative importance of the edge to the network topology. In combination with a threshold value, as described above, the matrix of edge weightings may be used to detect anomalous changes to the network topology. It should be noted that for hashes that have a counter of over one, the values in the matrix may represent an edge from one of the vertices in the live graph representing this hash and not from every vertex representing this hash in the live graph.

Figure 10:
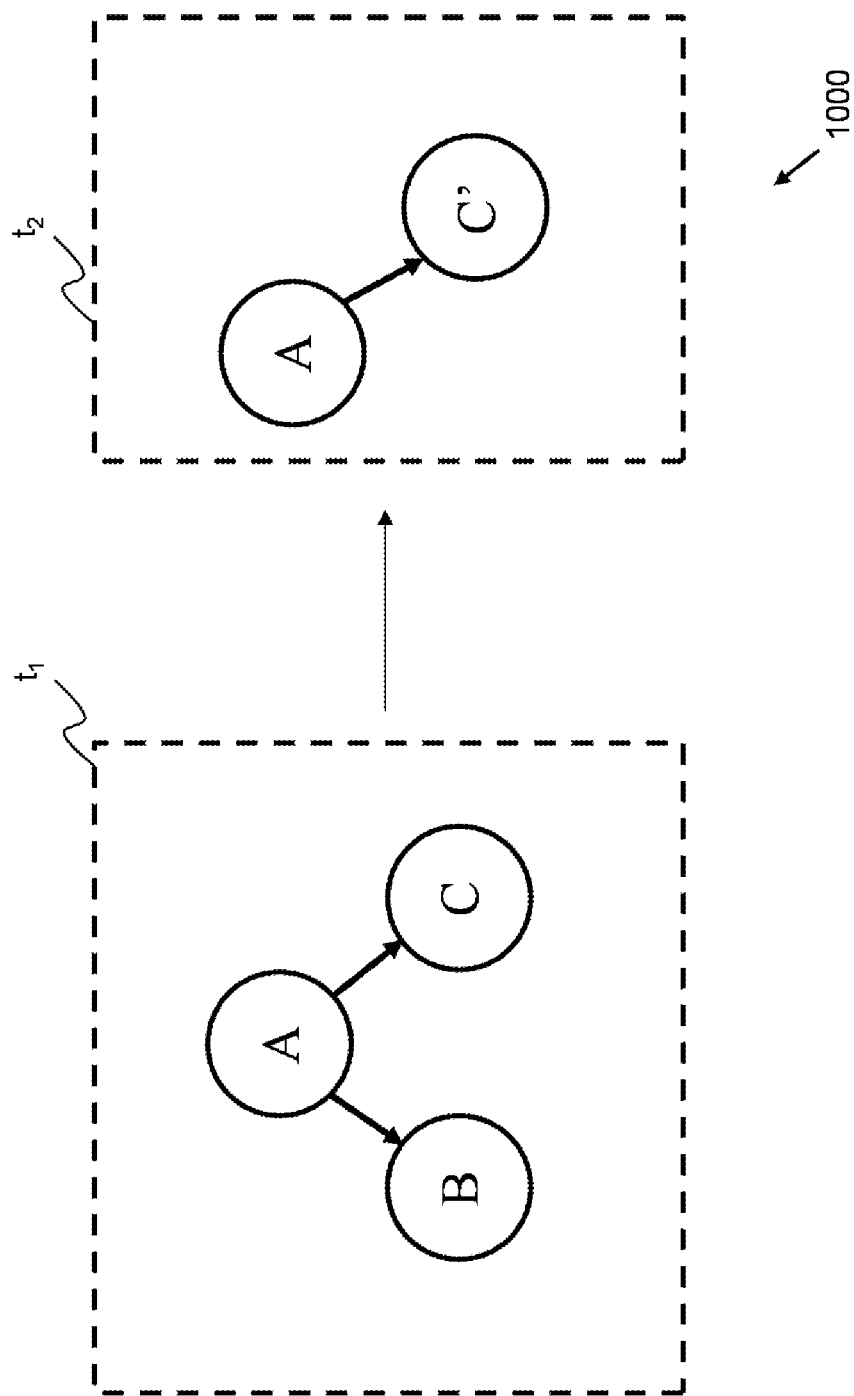
FIG. 10 depicts a schematic representation of a network topology at two points in time, in accordance with some embodiments of the present disclosure.

FIG. 10 depicts a schematic representation of a network topology at two points in time, in accordance with some embodiments of the present disclosure. With regard to the specific example shown in FIG. 10, taking H=($\alpha,\beta$,M) to be the abstract graph of a live graph G 1000, the $\alpha$ function can pick out the vertex name and vertex type of the vertices in the network topology and in G, the depicted graphs are presents at two different times (t1 and t2).

At time t1, the network topology includes vertex A, vertex B and vertex C with edges connecting vertex A to vertex B, referred to as edge AB, and vertex A to vertex C, referred to as edge AC. At time t2, network topology includes vertex A and vertex C' with an edge connecting vertex A to vertex C', referred to as edge AC'. Over the interval of t1 to t2, the edges AB and AC are lost along with vertices B and C and the edge AC' is added along with the vertex C'. However, upon inspection by the $\alpha$ function, the vertices C and C' may be found to have the same defining properties and so are mapped to the same hash code by the $\alpha$ function. For example, vertex C and C' may represent a pod which has been restarted.

At time t1, the matrix M may look like:

$$\begin{bmatrix} 0 & 0.8 & 0.95 \\ 0 & 0 & 0 \\ 0 & 0.1 & 0 \end{bmatrix},$$

where the rows and columns of the matrix represent the hashes of vertex A, vertex B and vertex C, respectively. Defining the upper threshold of the edge weightings as 0.75, meaning anything above 0.75 is considered to be an important edge, and the lower threshold as 0.25, meaning anything below 0.25 is considered to be a significant absence.

Subsequently, at time t2, using the above edge matrix, it can be seen that there is an important edge missing underlined below, i.e., edge AB:

$$\begin{bmatrix} 0 & \underline{0.8} & 0.95 \\ 0 & 0 & 0 \\ 0 & 0.1 & 0 \end{bmatrix}$$

The absence of the significant edge may be verified by checking the important edge from the matrix using the inverse of the $\alpha$ function. When an important edge is seen to be missing, an alert may be generated and sent to a user or automated system monitor to notify of this anomaly. Finally, the values of the matrix may be updated to reflect this change in the network topology via an update function. For example, after time t2, the matrix may become:

$$\begin{bmatrix} 0 & 0.79 & 0.96 \\ 0 & 0 & 0 \\ 0 & 0.09 & 0 \end{bmatrix}$$

Considering the $\beta$ function in the example network topology shown in FIG. 10, the $\beta$ function may take the following form at time t1:

$\beta:\alpha(A) \mapsto 0.99$
$\beta:\alpha(B) \mapsto 0.8$
$\beta:\alpha(C) \mapsto 0.98$ The $\beta$ function at time t1 would imply that vertex B is often seen in the graph, and that vertex A and vertex C are nearly always seen. After the update to the graph at time t2, the $\beta$ function would be checked and, by checking a, the existence of the importantly present and absent vertices would be checked against the thresholds defined above. After checking, the absence of the hash $\alpha(B)$ would be seen as significant and an anomaly in the network topology detected. Then the $\beta$ function may be updated to reflect this change:

$\beta:\alpha(A) \mapsto 0.995$
$\beta:\alpha(B) \mapsto 0.78$
$\beta:\alpha(C) \mapsto 0.985$ It should now be understood by those of skill in the art, in some embodiments of the present disclosure, the proposed concepts provide numerous advantages over conventional network monitoring approaches. These advantages include, but are not limited to, efficient and accurate identification of an incident. In embodiments of the present disclosure, this technical solution is accomplished by monitoring changes in the network topology.

In still further advantages to a technical problem, the systems and processes described herein provide a computer-implemented method for efficient network topology monitoring. In this case, a computer infrastructure, such as the computer system shown in FIGS. 1 and 4 or the cloud environment shown in FIG. 2 can be provided and one or more systems for performing the processes of the disclosure can be obtained (e.g., created, purchased, used, modified, etc.) and deployed to the computer infrastructure. To this extent, the deployment of a system can include one or more of:

(i) installing program code on a computing device, such as computer system shown in FIG. 1, from a computer-readable medium;
(ii) adding one or more computing devices to the computer infrastructure and more specifically the cloud environment; and
(iii) incorporating and/or modifying one or more existing systems of the computer infrastructure to enable the computer infrastructure to perform the processes of the invention.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A system for generating an abstract graph of a network topology, the system comprising:
   one or more computer processing circuits; and
   one or more computer-readable storage media storing program instructions which, when executed by the one or more computer processing circuits, are configured to cause the one or more computer processing circuits to perform a method comprising:
   for each of a plurality of vertices, generate a vertex weighting representative of a relative importance of a vertex within the network topology as a key resource in detecting an anomalous change to the network topology, the relative importance determined by at least in part on a frequency of appearance of the vertex in the network topology;
   for each of one or more edges, generate an edge weighting representative of a relative importance of an edge within the network topology;
   generate the abstract graph of the network topology based on a plurality of vertex weightings and one or more edge weightings;
   obtain, at a point in time after initialization of the abstract graph, a live graph of the network topology, the live graph representing the plurality of vertices and the one or more edges currently present in the network topology; and
   compare the live graph of the network topology to the abstract graph of the network topology to determine whether a change to the network topology is anomalous.

2. A method for generating an abstract graph of a network topology, the method comprising:
   for each of a plurality of vertices, generating a vertex weighting representative of a relative importance of a vertex within the network topology as a key resource in detecting an anomalous change to the network topology;
   for each of one or more edges, generating an edge weighting representative of a relative importance of an edge within the network topology, the relative importance determined by at least in part on a frequency of appearance of the vertex in the network topology;
   generating the abstract graph of the network topology based on a plurality of vertex weightings and one or more edge weightings;
   obtaining, at a point in time after initialization of the abstract graph, a live graph of the network topology, the live graph representing the plurality of vertices and the one or more edges currently present in the network topology; and
   comparing the live graph of the network topology to the abstract graph of the network topology to determine whether a change to the network topology is anomalous.

3. The method of claim 2, wherein the method further includes:
   adjusting the plurality of vertex weightings based on the change to the network topology determined based on the comparison of the live graph to the abstract graph of the network topology; and
   generating an updated abstract graph of the network topology based on the adjusted plurality of vertex weightings.

4. The method of claim 3, wherein adjusting the plurality of vertex weightings includes:
   determining whether a vertex present in the live graph is present in the abstract graph of the network topology:
   in response to determining the vertex present in the live graph is present in the abstract graph of the network topology, adjusting the vertex weighting of the vertex; and
   in response to determining the vertex present in the live graph is not present in the abstract graph of the network topology, generating a vertex weighting representative of a relative importance of the vertex within the network topology; and
   determining whether a vertex present in the abstract graph of the network topology is absent in the live graph:
   in response to determining the vertex present in the abstract graph of the network topology is absent in the live graph, adjusting the vertex weighting of the vertex.

5. The method of claim 4, wherein, in response to the vertex being present in the abstract graph of the network topology and absent in the live graph, the method further includes:
   comparing the vertex weighting of the vertex to an upper threshold value; and
   in response to the vertex weighting being greater than the upper threshold value, generating an alert.

6. The method of claim 4, wherein, in response to the vertex being present in the abstract graph of the network topology and the live graph, the method further includes:
   comparing the vertex weighting of the vertex to a lower threshold value; and
   in response to the vertex weighting being less than the lower threshold value, generating an alert.

7. The method of claim 4, wherein, in response to the vertex being present in the abstract graph of the network topology and the live graph, adjusting the vertex weighting of the vertex includes increasing the vertex weighting.

8. The method of claim 4, wherein, in response to determining that the vertex is absent in the live graph, adjusting the vertex weighting of the vertex includes decreasing the vertex weighting of the vertex.

9. The method of claim 3, wherein the method further includes:
   obtaining an identifying feature of each vertex;
   generating a hash code for each vertex based on the identifying feature; and
   assigning the vertex weighting of each vertex to the respective hash code as a hash weighting.

10. The method of claim 9, wherein obtaining the live graph of the network topology includes, for each vertex present in the live graph:
    determining whether a hash code exists for a vertex:
    in response to determining the hash code exists for the vertex:
    assigning the hash weighting of the hash code to the vertex as the vertex weighting; and
    adjusting the hash weighting based on the change to the network topology; and
    in response to determining the hash code does not exist for the vertex:
    obtaining an identifying feature of the vertex;

generating a hash code for the vertex based on the identifying feature; and assigning the vertex weighting of the vertex to the respective hash code as a hash weighting.

11. The method of claim 2, wherein the method further includes:

adjusting the one or more edge weightings based on the change to the network topology determined based on the comparison of the live graph to the abstract graph of the network topology; and generating an updated abstract graph of the network topology based on the adjusted edge weightings.

12. The method of claim 11, wherein the method further includes:

determining whether an edge present in the live graph is present in the abstract graph of the network topology:

in response to determining the edge present in the live graph is present in the abstract graph of the network topology, adjusting the edge weighting of the edge; and in response to determining the edge present in the live graph is not present in the abstract graph of the network topology, generating an edge weighting representative of a relative importance of the edge within the network topology; and determining whether an edge that is present in the abstract graph of the network topology is absent in the live graph:

in response to determining the edge that is present in the abstract graph of the network topology is absent in the live graph, adjusting the edge weighting of the edge.

13. The method of claim 12, wherein, in response to the edge being present in the abstract graph of the network topology and absent in the live graph, the method further includes:

comparing the edge weighting of the edge to an upper threshold value; and in response to the edge weighting being greater than the upper threshold value, generating an alert.

14. The method of claim 12, wherein, in response to the edge being present in the abstract graph of the network topology and the live graph, the method further includes:

comparing the edge weighting of the edge to a lower threshold value; and in response to the edge weighting being less than the lower threshold value, generating an alert.

15. The method of claim 12, wherein, in response to the edge being present in the abstract graph of the network topology and the live graph, adjusting the edge weighting of the edge includes increasing the edge weighting.

16. The method of claim 12, wherein, in response to the edge being present in the abstract graph of the network topology and absent in the live graph, adjusting the edge weighting of the edge includes decreasing the edge weighting of the edge.

17. The method of claim 2, wherein the vertex weightings and the edge weightings are fuzzy weightings having a value greater than or equal to zero and less than one.

18. A computer program product for generating an abstract graph of a network topology, the computer program product comprising one or more computer readable storage media, and program instructions collectively stored on the one or more computer readable storage media, the program instructions comprising instructions configured to cause one or more processors to perform a method comprising:

for each of a plurality of vertices, generating a vertex weighting representative of a relative importance of a vertex within the network topology as a key resource in detecting an anomalous change to the network topology, the relative importance determined by at least in part on a frequency of appearance of the vertex in the network topology;

for each of one or more edges, generating an edge weighting representative of a relative importance of an edge within the network topology;

generating the abstract graph of the network topology based on a plurality of vertex weightings and one or more edge weightings;

obtaining, at a point in time after initialization of the abstract graph, a live graph of the network topology, the live graph representing the plurality of vertices and the one or more edges currently present in the network topology; and comparing the live graph of the network topology to the abstract graph of the network topology to determine whether a change to the network topology is anomalous.

19. The computer program product of claim 18, wherein the method further includes:

adjusting the plurality of vertex weightings based on the change to the network topology determined based on the comparison of the live graph to the abstract graph of the network topology; and generating an updated abstract graph of the network topology based on the adjusted vertex weightings.

20. The computer program product of claim 18, wherein adjusting the plurality of vertex weightings includes:

determining whether a vertex present in the live graph is present in the abstract graph of the network topology:

in response to determining the vertex present in the live graph is present in the abstract graph of the network topology, adjusting the vertex weighting of the vertex; and in response to determining the vertex present in the live graph is not present in the abstract graph of the network topology, generating a vertex weighting representative of a relative importance of the vertex within the network topology; and determining whether a vertex that is present in the abstract graph of the network topology is absent in the live graph:

in response to determining the vertex is absent in the live graph, adjusting the vertex weighting of the vertex.

* * * * *